US007281262B2

(12) United States Patent
Hayes et al.

(10) Patent No.: US 7,281,262 B2
(45) Date of Patent: Oct. 9, 2007

(54) UNIVERSAL REMOTE CONTROL SYSTEM

(75) Inventors: Patrick H. Hayes, Mission Viejo, CA (US); Robert A. Campbell, Costa Mesa, CA (US)

(73) Assignee: Universal Electronics Inc., Cypress, CA (US)

( * ) Notice: Subject to any disclaimer, the term of this patent is extended or adjusted under 35 U.S.C. 154(b) by 973 days.

(21) Appl. No.: 09/796,405

(22) Filed: Feb. 28, 2001

(65) Prior Publication Data

US 2001/0009039 A1    Jul. 19, 2001

Related U.S. Application Data

(63) Continuation of application No. 08/923,373, filed on Sep. 3, 1997, now Pat. No. 6,223,348.

(51) Int. Cl.
*H04N 7/16* (2006.01)

(52) U.S. Cl. ...................................... 725/153; 348/734

(58) Field of Classification Search ................ 725/153, 725/134, 141; 348/734, 737
See application file for complete search history.

(56) References Cited

U.S. PATENT DOCUMENTS

| 4,630,201 | A | * | 12/1986 | White ........................... 705/44 |
| 4,866,434 | A | * | 9/1989 | Keenan ................... 340/825.72 |
| 5,029,207 | A | * | 7/1991 | Gammie ...................... 380/228 |
| 5,341,166 | A | * | 8/1994 | Garr et al. ................... 725/153 |
| 5,668,591 | A | * | 9/1997 | Shintani ...................... 725/140 |
| 5,870,155 | A | * | 2/1999 | Erlin ........................... 348/734 |
| 5,953,047 | A | * | 9/1999 | Nemirofsky ................. 725/23 |
| 6,069,672 | A | * | 5/2000 | Claassen ..................... 348/734 |
| 6,182,072 | B1 | * | 1/2001 | Leak et al. ................... 707/10 |
| 6,345,263 | B1 | * | 2/2002 | Matsumoto et al. .......... 705/41 |
| 6,484,011 | B1 | * | 11/2002 | Thompson et al. ......... 455/3.06 |
| RE38,600 | E | * | 9/2004 | Mankovitz .................. 348/473 |

FOREIGN PATENT DOCUMENTS

| WO | WO94/09570 | 4/1994 |
| WO | WO9409570 A1 * | 4/1994 |

* cited by examiner

*Primary Examiner*—Andrew Y. Koenig
(74) *Attorney, Agent, or Firm*—Gary R. Jarosik

(57) ABSTRACT

A remote control adapted for use with a releasable readable media storage device. A readable media storage device having data and target indicators. Electrical contacts provide releasable connection with the remote control.

7 Claims, 7 Drawing Sheets

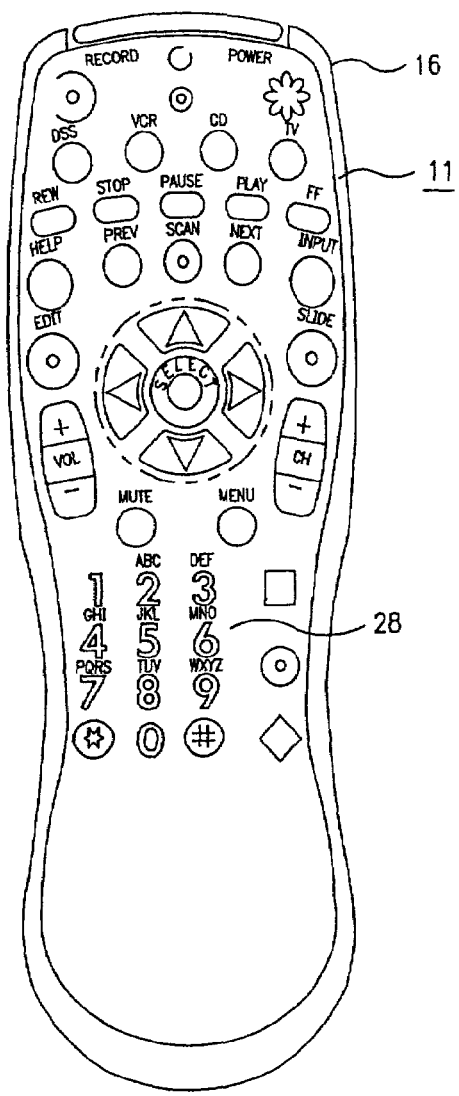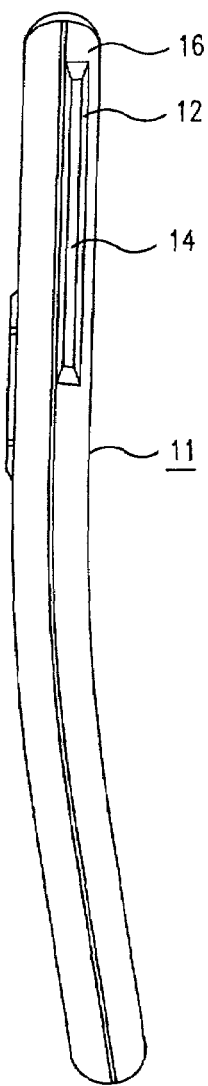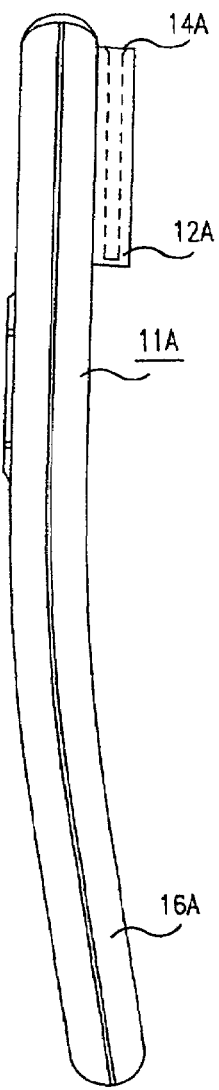
FIG. 1    FIG. 2    FIG. 3
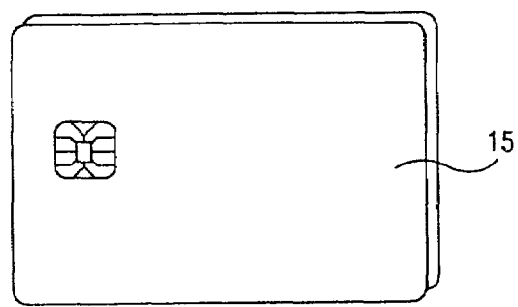
FIG. 4

UNIVERSAL REMOTE CONTROL SYSTEM

This application is a Continuation of U.S. patent application Ser. No. 08/923,373 filed on Sep. 3, 1997 now U.S. Pat. No. 6,223,348, entitled UNIVERSAL REMOTE CONTROL SYSTEM, which is incorporated by reference in its entirety.

BACKGROUND OF THE INVENTION

The present invention is directed to a universal remote control system which includes the use of a releasable readable media storage device, such as a Smart Card (herein referred to as "Smart Card" or "Card"), in transferring information and data to/from the remote control. A typical releasable readable media storage device is characterized as a device with a non-volatile memory and, in many cases, a microprocessor, which can be releasably mated with a reading device. For example, a Smart Card includes one or more chips (integrated circuits) that are imbedded in the Card for receiving and storing information and data. This information and data can then be "read" from or "written" to the Smart Card.

Smart Cards are in wide spread use and can be broadly classified as either contact, contactless or hybrid Cards. The contact type of Card utilizes appropriate technology to establish a physical electrical contact with an associated device which can read the information on the Smart Card. In the contactless type, the Card is passed over the appropriate technology to be powered by suitable inductive coils and the Card then sends a signal through capacitive plates. A hybrid type of Card is a combination of the two foregoing types. While any of the foregoing types of Cards could be used in the present invention, the preferred embodiment utilizes a contact type Card which connects to an associated remote control, as will be described. Other types of readable media storage devices which can be used in the present invention include virtually any type of releasable media storage device, and the invention is not limited to the use of a Smart Card.

The present invention relates to a user-configurable universal remote control having its device codes, that is the sets of code data needed to operate various electronic devices, supplied from a releasable readable media storage device. In the preferred embodiment, this readable media storage device is a Smart Card. The universal remote control unit is provided or sold to a particular user essentially "empty" of the code data needed to configure the remote control to that user's television, video cassette recorder ("VCR"), cable box, Internet access device or other electronic device. The universal remote control is built with a reader slot or port into which the user can insert separately purchased "device library" Cards which contain the sets of code data necessary to configure the remote control to operate all or some of those electronic devices the user wishes to control. Additional sets of code data can be added to the remote control any time the user obtains a new electronic device, up to the maximum capacity of the remote control, through the use of additional Smart Cards.

The releasable readable media storage device, i.e., Smart Card, to be utilized in the present invention contains a compilation of the device codes suitable for use with a particular universal remote control, and allows a one time transfer of a single device code (i.e., the set of code data needed to remotely operate a particular electronic device) from the readable media storage device into the remote control's on board, non-volatile memory. In the preferred embodiment, a Smart Card constructed of low cost material is utilized and is good for only one use. In one alternative embodiment, each Smart Card is designed for more than one use. In another alternative embodiment, the universal remote control system of the present invention is designed so that information/data from the remote control can be downloaded into and remain stored in a releasable readable media storage device, e.g., a certain device code may be transferred from the remote control to a Smart Card. In a more complicated embodiment involving two-way communication between the remote control and an electronic device, the universal remote control of the subject invention contains an infrared receiver for the purpose of receiving information from a television, computer or other electronic device and a means for transferring such information into the memory of a readable media storage device releasably mateable with that remote control. In such an embodiment, information/data can be transferred from a user's electronic device to the remote control to the readable media storage device, e.g. a video coupon appearing on a television could be transferred from the television to the remote control and then to a Smart Card for later use in a store or other shopping facility where the coupon could be redeemed.

In the preferred embodiment, to set up the universal remote control to operate a particular electronic device, a Smart Card must be inserted into a reader slot or port in the remote control. The location of this reader slot can vary depending on the design requirements of a particular universal remote control. Once the Card is inserted into the reader slot or port, the user is able to experiment with various device codes until he finds the one which will operate his electronic device. Once the user locks in a particular device code, that device code (i.e., set of code data) is transferred into the remote control's non-volatile memory and the balance of the code data on the Card is either erased or blocked from further use.

Another application of the present invention is in the cable television industry. Operators which provide cable or satellite television service to a number of subscriber's receiver sets are faced with the necessity of maintaining control of the service provided to each of the individual sets. Conversely, subscribers to such cable and satellite services each have individual needs and requirements as to the channels, features and functions available on and to their television sets. For example, a cable or satellite service provider offers various types of services to its television subscribers and each subscriber normally has a choice of selecting what channels and/or what programs he or she desires to receive. Accordingly, a service provider must be able to provide the desired service to each subscriber, and the provider must be able to keep track and control over the type of service provided to each subscriber. A subscriber may also want to periodically change or vary the services or functions available on his or her set, or to add equipment to his or her entertainment system.

At present there are various ways for the service providers to track and maintain control of such service, and various ways for the subscriber to change the service he or she receives or the functions available to him or her. However, the known methods and apparatus for maintaining such control and/or making such changes are relatively expensive and cumbersome. The functions, services and equipment currently known are not readily flexible to meet the individual subscriber's needs. The present invention addresses these disadvantages of these known methods and apparatus.

In the system, method and apparatus of the present invention, the user's remote control unit has slots or ports for accommodating one or more releasable readable media storage devices. The releasable readable media storage device of the present invention is utilized in a unique manner with the remote control to provide code data to the remote control and to provide control commands and programming data to the associated electronic devices, as will be described. In addition, the universal remote control system of the present invention can be utilized for two-way communication and used for home shopping, electronic banking, and pay-per-view movie purchase.

BACKGROUND ART

A patent of interest relative to the present invention is U.S. Pat. No. 5,214,622 which discloses a television monitor including a remote control. The remote control is provided with a slot into which memory cards are inserted. The remote control of U.S. Pat. No. 5,214,622 is adapted to use a memory card to provide information which can be transferred between the remote control and the display means. U.S. Pat. No. 5,214,622 is basically directed to providing a calendar timer superimposed on the television display serving as a reference for displaying the information. The remote control also contains a transparent pressure sensitive pad covering a liquid crystal display for inputting hand written information, as well as the standard alpha-numerical and symbol keys for inputting remote control commands such as channel selection, volume control, etc.

Another patent of interest with respect to the present invention is U.S. Pat. No. 5,594,493 which discloses a Smart Card utilized with a television system. The Smart Card disclosed in U.S. Pat. No. 5,594,493 has a photoelectric optical pick-up device embedded in the Card for receiving and storing a signal from the television set. The stored data can be subsequently displayed and read. The Card of U.S. Pat. No. 5,594,493 is used to record data relating to product identification for use in product promotion and sales. The Cards allow advertisers to make special offers of products to the Card holders for use within specific and varied time periods. The patent states that the Card affords a nearly fail safe data transmission via standard computer and television transmission methods.

SUMMARY OF INVENTION

The present invention relates to a user-configurable universal remote control having its device codes, that is the sets of code data needed to operate various electronic devices including Internet access devices, supplied from a releasable readable media storage device. (The system of the present invention can also be utilized with a dedicated remote control wherein the code data needed to operate a particular electronic device is supplied to the dedicated remote control from a releasable readable media storage device.) In the preferred embodiment, this readable media storage device is a Smart Card. The universal remote control is provided or sold to a particular user essentially "empty" of the code data needed to configure the remote control to that user's television, VCR, cable box, Internet access device or other electronic device. The universal remote control is built with a reader slot into which the user can insert separately purchased "device library" Cards which contain the sets of code data necessary to configure the remote control to operate all or some of those electronic devices the user wishes to control. Additional sets of code data can be added to the remote control at any time the user obtains a new electronic device, up to the maximum capacity of the remote control, through the use of additional Smart Cards.

The releasable readable media storage device, i.e., Smart Card, to be utilized in the present invention contains a compilation of the device codes suitable for use with a particular universal remote control, and allows a one time transfer of a single device code (i.e., the set of code data needed to remotely operate a particular electronic device) from the readable media storage device into the remote control's on board, non-volatile memory. In the preferred embodiment, a Smart Card constructed of low cost materials is utilized and is good for only one use. In one alternative embodiment, each Smart Card is designed for more than one use. In another alternative embodiment, the universal remote control system of the present invention is designed so that information from the remote control can be downloaded into and remain stored in a releasable readable media storage device, e.g., a certain device code may be transferred from the remote control to the releasable readable media storage device. In a more complicated embodiment involving two-way communication between the remote control and an electronic device, the universal remote control of the subject invention contains an infrared receiver for the purpose of receiving information from a television, computer or other electronic device and a means for transferring and storing such information in the memory of a readable media storage device releasably mateable with that remote control. In such an embodiment, information can therefore be transferred from a user's electronic device to the remote control to the readable media storage device and stored in that device's memory for later use, e.g. a video coupon appearing on a television could be transferred from the television to the remote control and then to a Smart Card for later use in a store or other shopping facility where the coupon could be redeemed.

To set up the universal remote control to operate a particular electronic device, a releasable readable media storage device, namely a Smart Card, must be inserted into a reader slot in the remote control. The location of this reader slot can vary depending on the design requirements of a particular universal remote control. Once the Card is inserted into the reader slot, the user is able to experiment with various device codes until he finds the one which will operate his electronic device. Once the user locks in a particular device code, that code is transferred into the remote control's non-volatile memory and the balance of the code data on the Card is either erased or blocked from further use using known techniques.

The foregoing system can be used with any electronic device and/or any Internet access device utilizing a remote control. The releasable readable media storage device will include code data for programming the remote control and can also include additional data for controlling the functions and features of the various electronic devices which are controllable by said remote control.

The foregoing features and advantages of the present invention will be apparent from the following more particular description of the invention. The accompanying drawings, listed herein below, are useful in explaining the invention.

DESCRIPTION OF DRAWINGS

FIG. 1 is a front view of a remote control including an internally mounted connector for receiving a releasable readable media storage device which is inserted in a slot opening to the side of the remote control;

FIG. 2 is a side view of the remote control of FIG. 1;

FIG. 3 is a side view of a modification of the remote control of FIG. 1, wherein the connector is formed to be externally mounted on the remote control; the Smart Card is inserted in a slot opening to the top of the remote control;

FIG. 4 shows a drawing of a Smart Card used in the present invention;

DESCRIPTION OF THE INVENTION

Figure 5A:
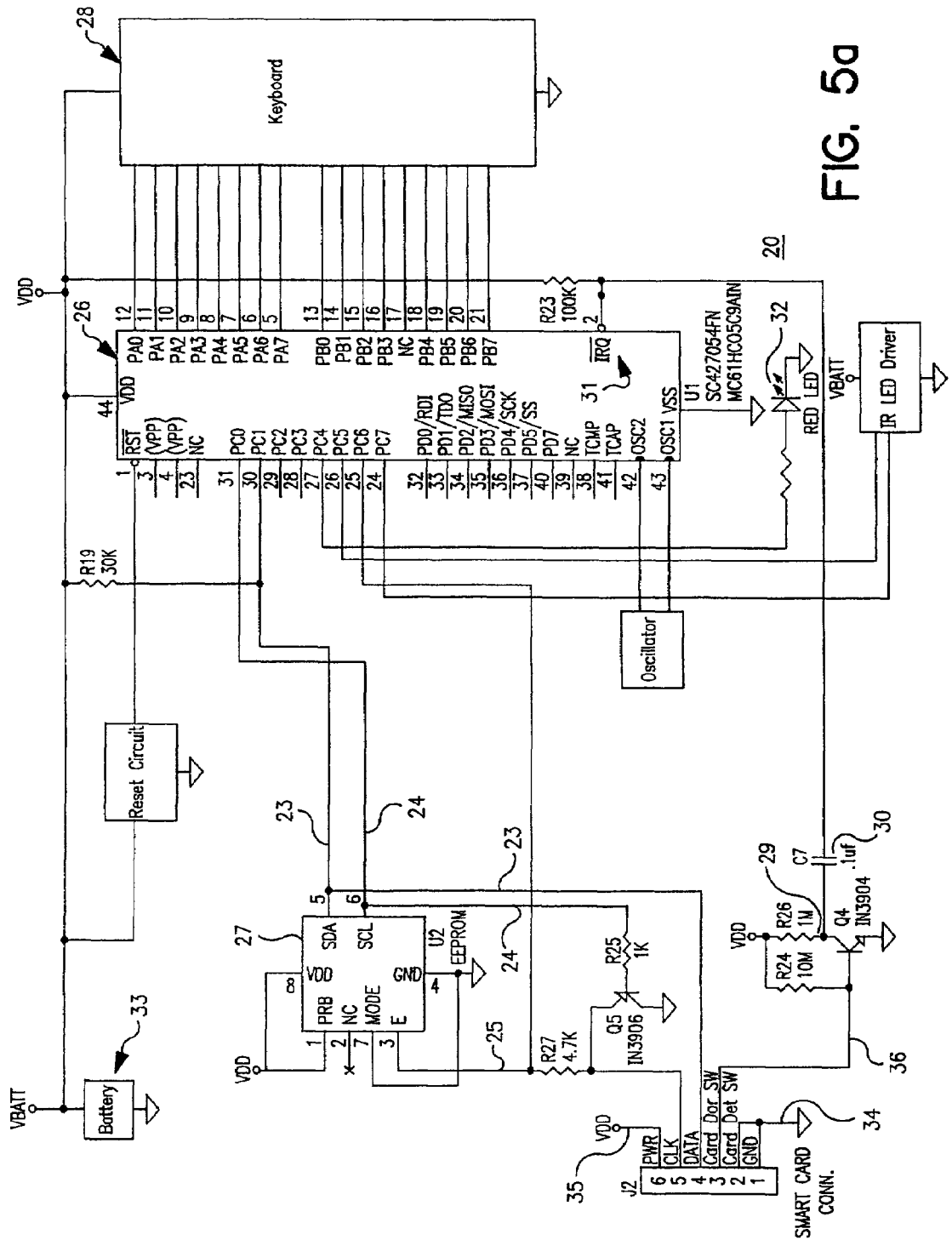
FIG. 5A is a schematic diagram of the Smart Card interface as in a remote control.

The present invention discloses new and unique uses for a system including a universal remote control and a releasable readable media storage device. The releasable readable media storage device and remote control of the present invention can also provide control for additional equipment including Internet accessible devices. The present invention also enables the releasable readable media storage device to interact with the remote control to vary, change and control the functions of a television receiver, cable box or satellite decoder receiving signals from a service operator. Importantly each user can, by using the appropriate releasable readable media storage device, readily and conveniently configure his remote control to the desired functions, features and channels he obtains from the service operator.

FIGS. 1 and 2 show a remote control 11, generally patterned after so called universal remote controls of suitable known type. In addition to the standard components and circuitry, remote control 11 includes a connector 12 for a releasable readable media storage device, a Smart Card 15 in the preferred embodiment, which selectively reads and writes to the remote control 11. Connector 12 comprises a slot or port 14 and a suitable known type socket for connecting to the Smart Card 15. Slot 14 is molded directly into the case or body 16 of the remote control 11. Case 16 is preferably made of plastic material. In the embodiment shown, the slot 14 opens to the side of case 16. Slot or port 14 receives a Smart Card 15 shown in FIG. 4. Smart Card 15 is approximately 3.3×2.1 inches in size.

Connector 12 can comprise a plurality of slots to accommodate or receive one or more Smart Cards 15 which are inserted in respective slots in the connector 12. However, in the preferred embodiment and also for purposes of clarity in the drawing, only one slot 14 is indicated. Additional slots as needed may be formed in connector 12 parallel to slot 14 or elsewhere in the remote control 11.

The electrical and mechanical interface of Smart Card 15 with the remote control 11 conforms to, and complies with, the international standard ISO 7816 for integrated circuit cards which have an interface with electrical contacts. Each slot 14 formed in connector 12 would have a similar interface.

It should be clearly understood that, while the electrical and mechanical interface used in Smart Card 15 is in accordance with 7816 standards, in the preferred embodiment shown the software protocols and data being transferred are unique to the present invention. However, in other applications, the protocol(s) and/or data transferred may correspond to a pre-existing standard format suited to that application, e.g. home banking as explained below.

FIG. 3 shows a modification 11A of the remote control 11 of FIGS. 1 and 2. In the embodiment of FIG. 3, the connector 12A is formed essentially as a box externally of the case 16A and appropriately affixed to the case 16A. In the embodiment of FIG. 3, the slot 12A opens upwardly, as indicated by the dotted lines in the Figure, and the Smart Card 15 is inserted into the slot 14A from the top of the remote control 11. The operation of the remote control 11 and the Smart Card 15 as depicted in FIG. 3 are the same as for the embodiment of FIGS. 1 and 2.

FIG. 5A shows the electronic circuitry 20 for the remote control 11 and the Smart Card 15. The circuitry of FIG. 5A, and the operation of the circuitry are well known, hence detailed description is not believed necessary. Microprocessor 26 may be of any suitable known type. The keypad 28 (which includes the various known television TV and VCR function keys depicted in FIG. 1) enables user inputs to microprocessor 26. Referring to the lower left hand corner of FIG. 5A, the connector 12 receives the Smart Card 15 and connects via leads 23 and 24 to the remote control 15 microprocessor 26. The connector 12 also supplies power from the remote control batteries 33 to the chip on the Smart Card via connections 34 and 35. Additionally, a contact is provided within connector 12, attached to lead 36, which is used to notify the microprocessor 26 that a Smart Card 15 has been inserted, as is described in greater detail later in conjunction with the flowchart of FIG. 6. The data in Smart Card 15 selectively control or alter the functionality of the microprocessor 26 in accordance with the data programmed and stored in Smart Card 15. Microprocessor 26 can also write to Card 15.

Figure 5B:
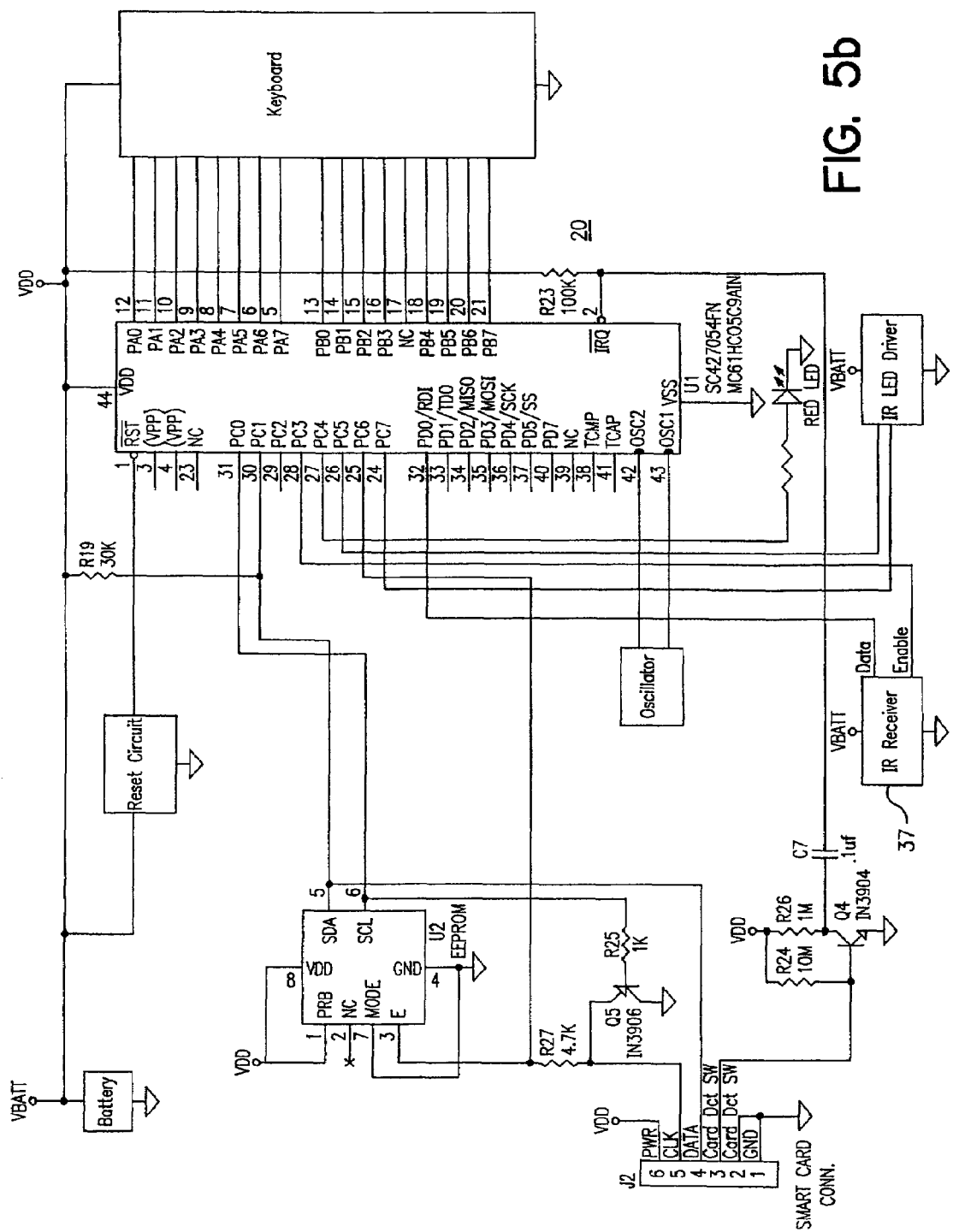
FIG. 5B is the schematic diagram of FIG. 5A with the addition of an infrared receiver.

As will be explained herein below, the Smart Card technology of the present invention can be used to enable the remote control to alter various configurable features and/or information in a remote control or on the controlled devices, such as a television set; and, the Smart Card can be used to add code data for different electronic devices to be controlled by a universal remote control. FIG. 5B shows the electronic circuitry of a remote control (as explained above with reference to FIG. 5A) which includes an infrared receiving means 37.

Figure 6:
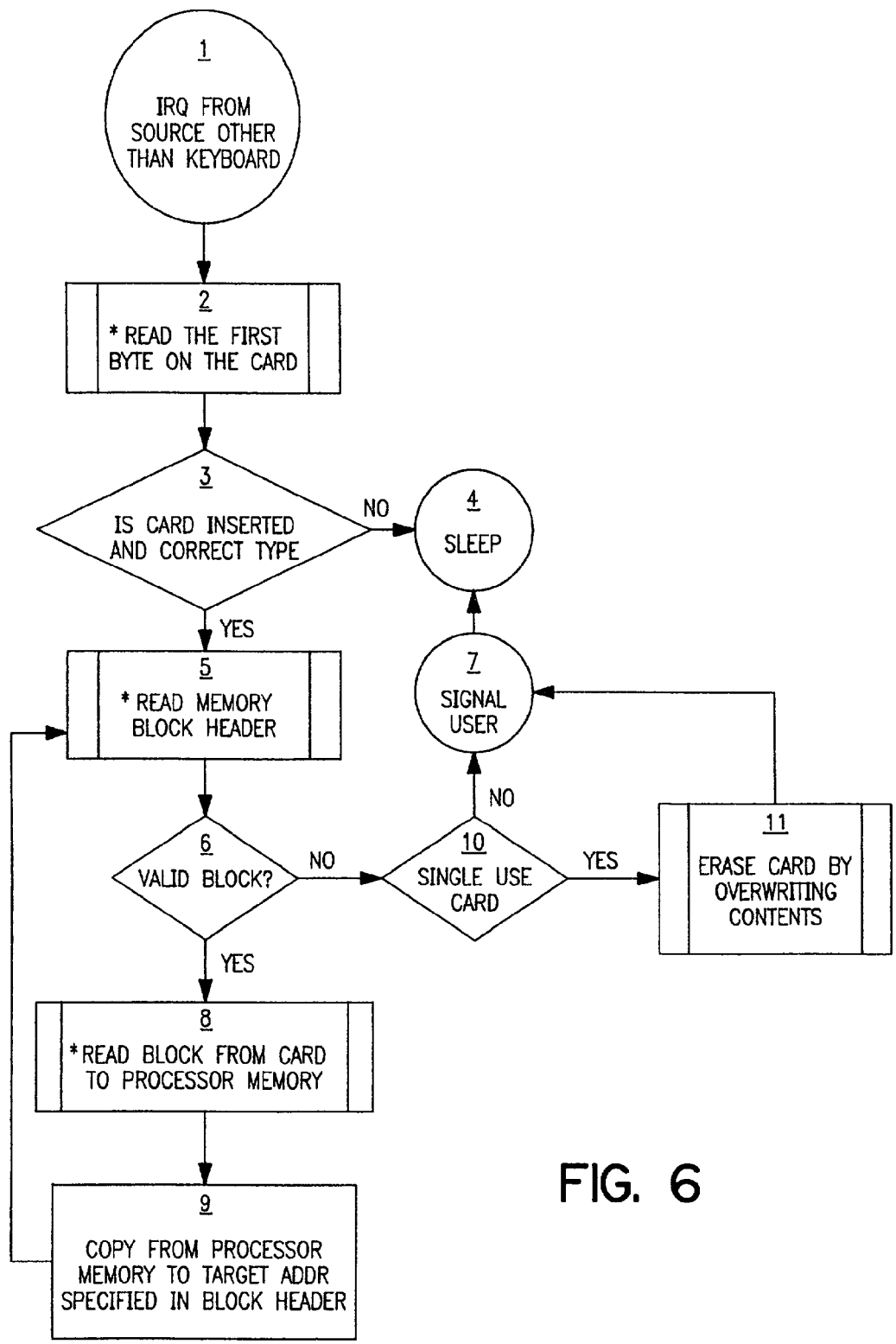
FIG. 6 is a flow chart of an operation of the Smart Card of the invention.

The flowchart of FIG. 6 describes the operation of the Smart Card 15 and remote control 11 circuitry of FIGS. 5A and 5B. Initially, the microprocessor 26 is in a "sleep," or shut down mode in order to minimize power consumption and conserve battery life. Insertion of the Smart Card 15 into slot 14 closes a contact which, via transistor 29 and capacitor 30, generates a pulse on the IRQ—(Interrupt Request) input pin 31 of the microprocessor 26. Receipt of this signal causes the microprocessor 26 to exit the previously described low power shut down state and begin normal execution. First, the microprocessor 26 inspects the status of the keypad matrix 28 in order to determine if it was "woken up" by the user pressing a key. (If a keypress was the cause of the IRQ signal, the microprocessor 26 would then proceed to execute the indicated remote control function in the normal way.) In the embodiment described in FIG. 6, however, the microprocessor 26 will determine that no key has been pressed, as described in block 1 of FIG. 6. Initially, the first byte of data on the Smart Card 15 is read and evaluated to determine if the Card 15 is of the correct type. If not, the microprocessor 26 returns to its idle state, as described in block 4 of FIG. 6. Next, the microprocessor 26 validates the memory block header stored on the Smart Card 15. This header contains information indicating where in the remote control's non-volatile memory the following Smart Card data bytes are to be stored, and for what purpose. If an invalid header is detected, the microprocessor 26 signals the user (by, for example, flashing the visible LED 32), and returns to the idle state, as described in block 7 of FIG. 6. Once a valid block header has been found, the balance of the data in that block on the Smart Card 15 is copied from the Smart Card 15 to the RAM memory 27 of the microprocessor 26, and then from there to the designated target address within the remote control's non-volatile memory, as described in blocks 8 and 9 of FIG. 6. On completion of this transfer, the microprocessor logic returns, as described in block 5 of FIG. 6, to check for another data block contained on the Smart Card 15. If one is found (as evidenced by a second valid memory block header immediately flowing the end of the first data block), the transfer cycle is repeated. This process continues until no further valid data blocks are found, at which point the microprocessor 26 now checks the Card type previously acquired to determine if the Smart Card 15 currently inserted in connector 12 is the "single use" type. If so, the microprocessor 26 writes data to the memory contained on the Smart Card 15 in order to erase or otherwise disable future use of the Card 15, as described in blocks 10 and 11 of FIG. 6. The microprocessor 26 then signals the user and returns to the idle state as described in block 7 of FIG. 6. In certain applications of the present invention, it may be desirable to provide additional security to the information and data stored on said Smart Card. In connection with such embodiments of the present invention, various security and encryption systems, including but not limited to a requirement that the user first activate the Smart Card through the use of a unique personal identification number ("PIN") keyed in by the user, have been proposed or implemented and are well known in the art.

Figure 7:
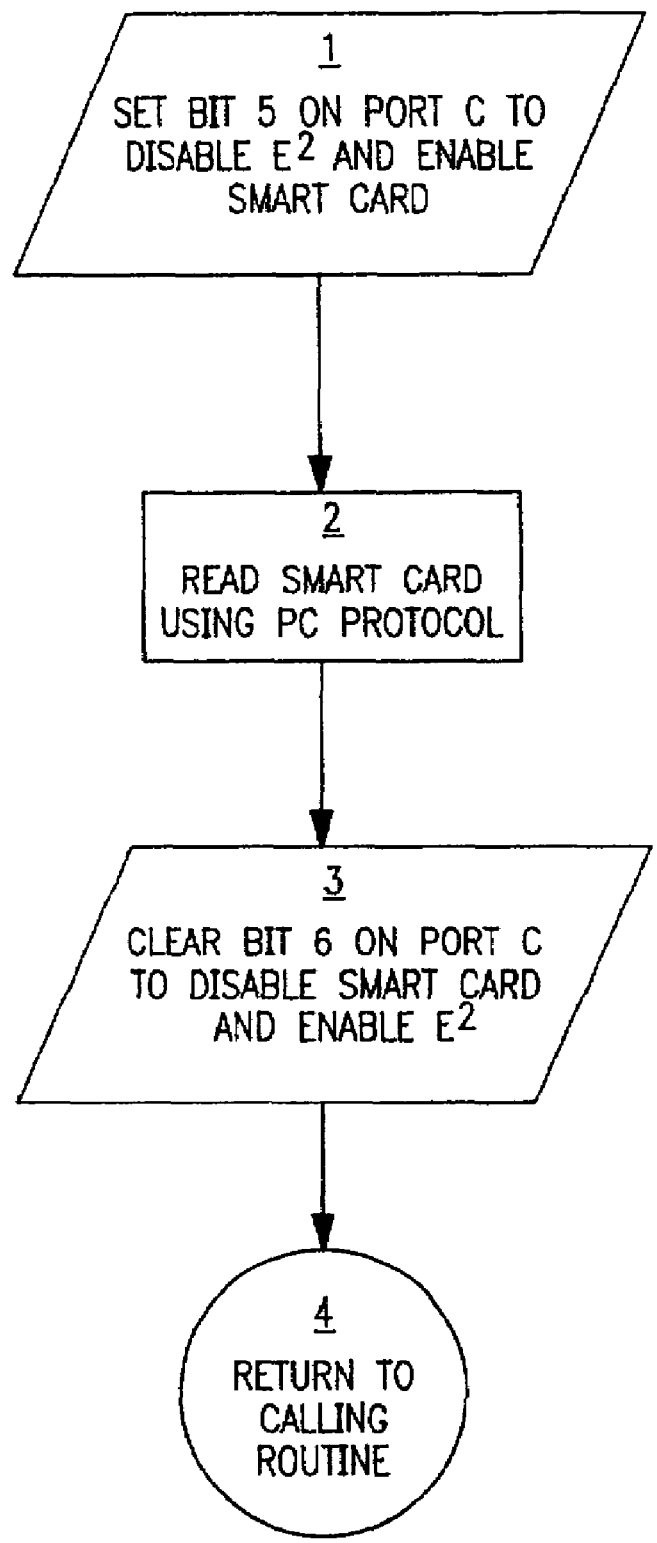
FIG. 7 is a flow chart showing the logic implemented to permit the Smart Card and EEPROM interfaces to share common electrical connections.

In the preferred embodiment shown in FIG. 5A, the Smart Card interface signals 23 and 24 are shared with those of the remote control's non-volatile memory EEPROM 27. Since the Smart Card 15 and EEPROM 27 have similar electrical interfaces, this allows common firmware code and microprocessor input/output pins to be used to communicate with both devices. Accordingly, a circuit and program logic must be provided to select which device is active at which time. This is accomplished by connecting an input/output port pin 38 on the microprocessor 26 in such a manner that when it is in one state it disables the onboard EEPROM 27 via its enable/disable pin 25 while simultaneously enabling output of the clock signal 24 to the Smart Card connector via transistor 39, while in the other state it enables the onboard EEPROM 27 while disabling the clock output to the Smart Card connection. The flowchart of FIG. 7 describes how this is accomplished by the firmware during the process of reading data from the Smart Card 15, e.g. while performing the functions shown in blocks 2, 5 and 8 of FIG. 6. The same process would be performed by the firmware in order to select the Smart Card 15 as a target to write data.

A basic concept of one embodiment of the present invention is to provide a standardized remote control 11 with separately available code data for operating different electronic devices. Various Smart Cards are made available for VCRs, for televisions, for stereos, etc. Each Smart Card 15 in the library has code data and programming to control different features, functions and equipment, such as on the television, the VCR and stereo in a user's home entertainment system.

In one embodiment, a user has a remote control 11 which is capable of controlling six devices. Initially the user may acquire "device library cards," to thereby provide code data to control three of the six possible devices supported by the remote control 11. If the user subsequently acquires a digital video disc ("DVD"), he can obtain the appropriate Smart Card for controlling the DVD via the remote control 11.

Figure 8:
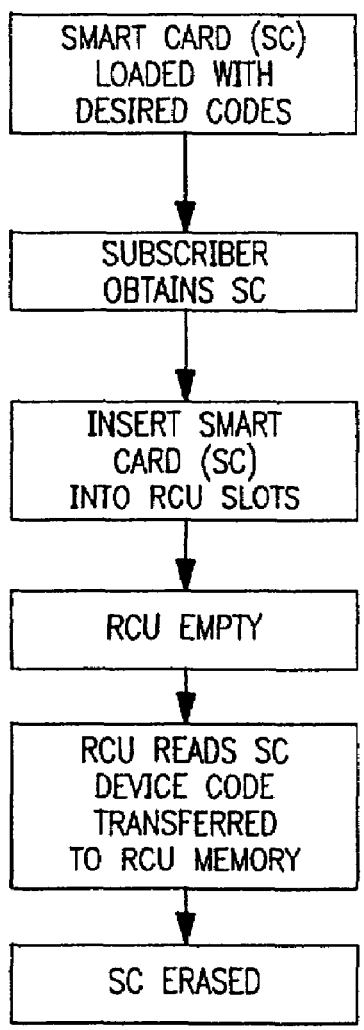
FIG. 8 shows a series of steps of illustrating the concept of inputting data into an empty remote control.

In the embodiment described in FIG. 8, the remote control 11 is essentially empty of code data. A Smart Card is provided to enable and control the features and equipment of the individual user. In this embodiment, the remote control 11 is essentially passive and is activated by a selected Smart Card 15. As depicted in FIG. 8, the user obtains and inserts the desired Smart Card into slot 12 of the remote control 11. The user selects the device code that matches his equipment to load the code data and programming for the selected functions and equipment into the remote control 11. Once the user locks in a particular device code that code alone is transferred into the remote control 11, and the Card may be erased or disabled.

The user separately acquires Smart Cards 15 to configure the remote control 11 for exactly those items of service, equipment, or channels he wishes to control. New items, features, functions and equipment are added at any time, up to the maximum capacity of the remote control 11.

Figure 9:
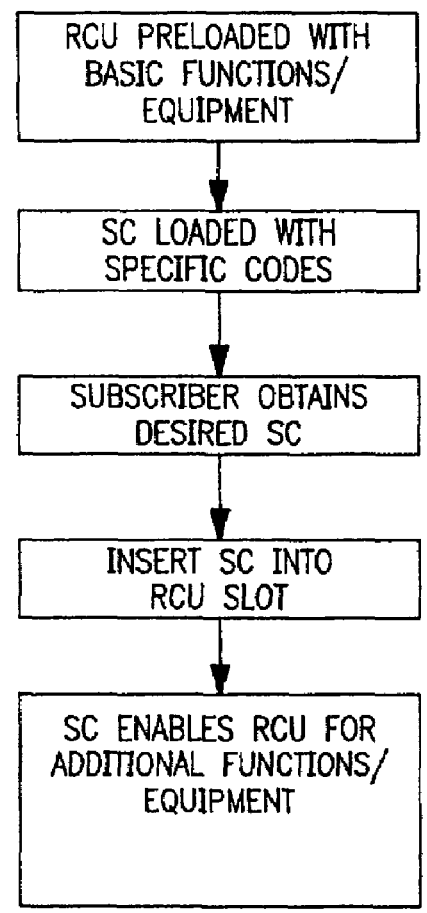
FIG. 9 shows a series of steps illustrating the concept of inputting data to enhance the functionality of the remote control.

FIG. 9 depicts a second embodiment in which the remote control 11 is preloaded with code data for basic functions and/or equipment. To enable the user to enhance his equipment, Smart Cards are made available that allow purchase of additional function groups of the user's choice or option such as PIP, menu, surround sound adjustments, etc. Also, the remote control 11 may be pre-loaded with a universal library for the basic devices (televisions, VCRs, cable boxes) together with Cards to enable operation of individual additional equipment (DVD, satellite, etc.) as the user adds this equipment to his entertainment system.

The Smart Cards 15 can be designed to allow a single or one time transfer of code data from the Smart Card into the onboard, non-volatile memory of the remote control 11. Since a Smart Card can be configured to provide essentially a single use it may be fabricated of low-cost materials to be relatively inexpensive. A one-time use capability of the Smart Card 15 acts as a validity and security check to assure that only authorized devices or functions are controlled or changed by a Smart Card 15. After use, the Smart Card 15 may be discarded. In a modification of the foregoing embodiment, the Smart Card 15 is erased after entry of its input to the remote control 11, and thereafter the "blank" Smart Card 15 may be recorded and reprogrammed for further use.

By use of the Smart Card technology of the present invention the user can conveniently add to the devices operated by his remote control 11 and the capability of his cable system. For instance, during the hockey season the user can sign on to receive the desired various sports channels for a limited time period. For such use, the cable provider mails an updated Smart Card 15 to the user and the user inserts the Smart Card 15 into the remote to enable his or her system to receive the desired sport channels for that limited period.

As stated above, remote controls 11 are fabricated with features that are enabled or disabled, and various built-in features may be enabled or disabled via Smart Card 15 loaded information. For the cable/satellite service provider, this means that they can selectively enable/disable various buttons or functions on the remote control 11, depending on what the individual customer has requested. Further this allows a distinct pricing of individual features such as sleep timer, time delay macro playback, favorite channel scan etc.

The Smart Card 15 can be updated to reflect changes in channel line up. A cable or satellite service provider who offers direct channel access keys on its remote control could simply mail an inexpensive Smart Card 15 out to all users whenever the channel line up changes. Thus, the Smart Card 15 becomes the means for delivery of upgraded subscription information, and can be used to modify a customer's service and update the remote control 11 as well.

Since the remote control 11 can transfer data into a Smart Card 15, Smart Cards are provided that limit access to a particular feature or television program, e.g. five pay-per view movies, monthly or special sport coverage, etc. The Smart Card 15 can, in effect, provide a credit card type of transaction. The remote control 11 is coded to send a particular control signal to the receiver a pre-set number of times, and can specify the data to send. The remote control 11 updates and decrements the authorized number in the Smart Card 15 each time the feature is used, and terminates when the count reaches zero. Alternatively, the remote control 11 can load the counter updated information from the Smart Card 15 into its own internal storage and operated therefrom. In this latter case, after transfer of the information, the Smart Card 15 is erased or disabled, and the card can be discarded.

Another significant use for Smart Card system of the present invention is to limit access to programs of different viewer rating. For example, children in a household have a Smart Card 15 that permits them to view selected programs on the cable system, or to access limited sites on the Internet. In contrast, the parents have Smart Cards with a broader choice of TV programs and/or an unrestricted access to the Internet.

Figure 10:
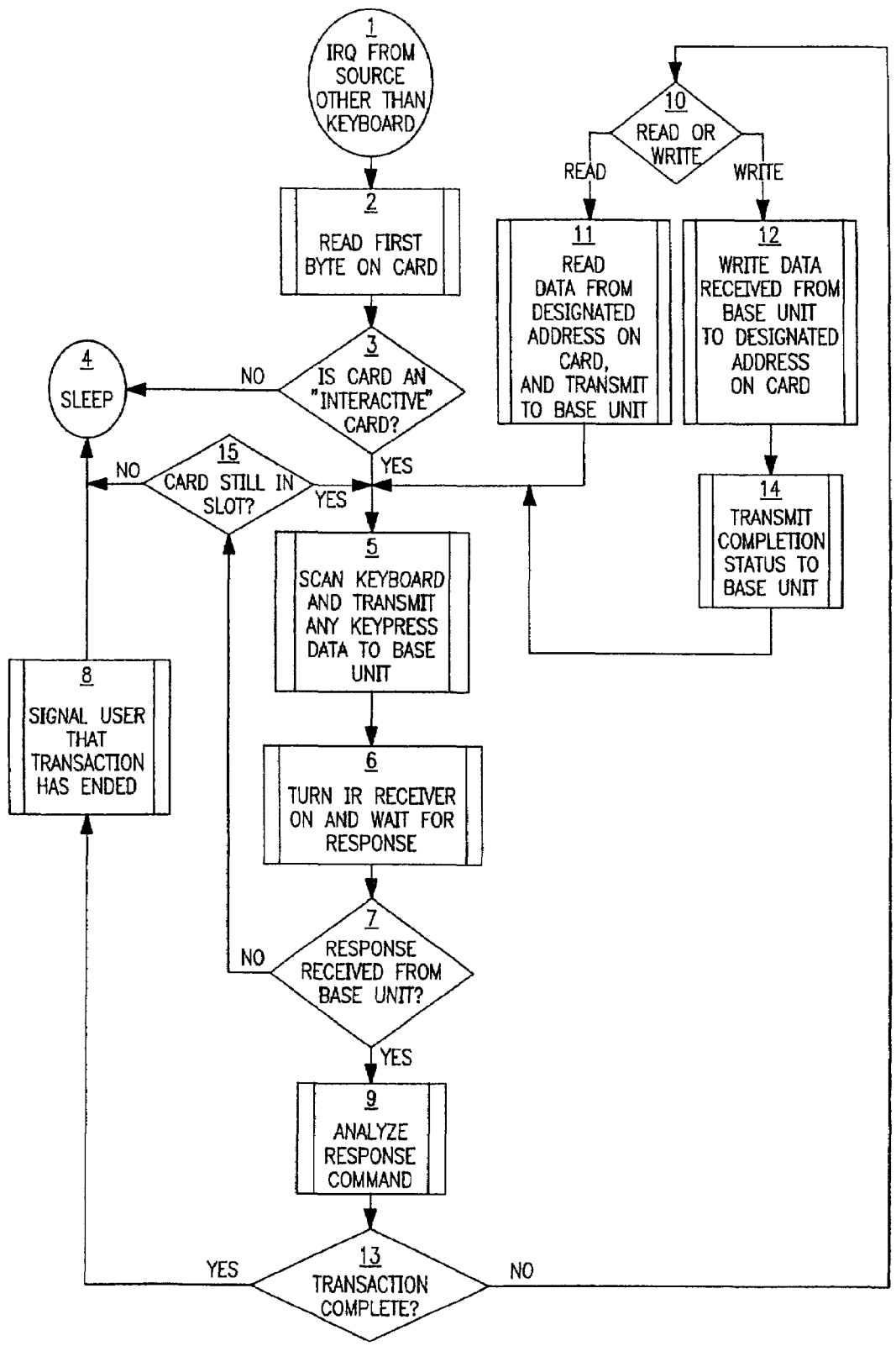
FIG. 10 shows a series of steps illustrating an electronic transaction utilizing the present invention.

The flowchart in FIG. 10 depicts another type of operation of the Smart Card 15, when used in a remote control 11 with electronic circuitry such as in shown in FIG. 5B, which includes an infrared receiver 37 in addition to the usual infrared transmitter. The addition of an infrared receiver 37 enables the microprocessor in the remote control 11 to engage in bi-directional communication with other devices such as a cable box, DBS receiver, Internet access device or specialized terminal device (referred to hereafter as "base unit"). There are many different methods and techniques for formatting and modulating data for transmission via infrared or other medium, all of which are well known and are hence not described here. It will also be appreciated that although the preferred embodiment uses infrared to implement this bidirectional communication, similar results could be obtained using other transmission technologies such as radio frequency, ultrasonic, etc.

The Smart Card transaction is initiated by insertion of the Card 15 in the same way as previously described in conjunction with the flowchart of FIG. 6. This is described in blocks 1 through 4 of FIG. 10. Once the microprocessor 26 has determined that the card type is "interactive" it enters a loop in which it successively checks for user keyboard 28 input (block 5), checks the infrared receiver 37 for data from the base unit (blocks 6 and 7), verifies that the Smart Card 15 is still inserted in the slot 14 (block 15), and repeats this sequence until either the card 15 is removed (at which point it returns to the idle state) or a command message is received from the base unit. The objective of this process is to allow the user of the remote control 11 to initiate a transaction with the base unit by keying in data on the remote control (for example a menu selection, a PIN, or some other information). Once the base unit has determined that a valid transaction is to occur, it then transmits a command to the remote control 11 to access data on the Smart Card 15, such as a cash balance, a pay-per-view movie credit, etc. This series of events are shown in the subsequent portion of the flowchart. At block 9 of FIG. 10, the remote control 11 examines the response command from the base unit. If it is "transaction complete," the remote control 11 signals the user (block 8) and returns to the idle state. If the response command is not "transaction complete," the remote control 11 then determines if the response is a command to read or to write Smart Card data (block 10), what location in the Smart Card's memory is to be accessed, and acts accordingly (blocks 11 and 12). If the command was a "write," the remote control 11 then signals completion to the base unit (block 14). After executing the read or write function, the remote control 11 returns to the original state (block 5) awaiting further action by the user or base unit. A typical transaction might consist of several of these sequences as, for example, the base unit first reads an account balance from the Smart Card 15, then interacts with the user to finalize a purchase, and finally debits the account balance and writes the updated value back to the Smart Card memory.

It will also be appreciated from the foregoing descriptions and the flowcharts of FIGS. 6 and 10, since the Smart Card type and function is identified in the data stored on the Card, that a single Smart Card can serve more than one purpose. Furthermore, these are not necessarily limited to only remote control applications. For example, a single Smart Card could contain data to both enable new subscription channels on a cable box or DBS receiver via that base units own Smart Card reader, and data to update the remote control functionality to enable access to that channel.

While the invention has been particularly shown and described with reference to a particular embodiment thereof it will be understood by those skilled in the art that various changes in form and detail may be made therein without departing from the spirit and scope of the invention.

What is claimed is:

1. A system comprising:
    a releasable media device;
    a network access device; and
    a hand-held unit for commanding operations of one or more home appliances comprising a microprocessor; a port in communication with the microprocessor in which the releasable media device is positionable, the port allowing the microprocessor to read data from and write data to the releasable media device; and a receiver and transmitter coupled to the microprocessor providing bi-directional, wireless communication between the network access device and the microprocessor;
    wherein the hand-held unit responds to a command received from the network access device by the receiver by transmitting a signal including an account balance read from the releasable media device via the microprocessor to the network access device using the transmitter and wherein the hand-held unit responds to an updated account balance received from the network access device by the receiver by writing the updated account balance to the releasable media device via the microprocessor.

2. The system as recited in claim 1, wherein the account balance read from releasable media device is used for enabling a purchase of one or more unlockable services made available via the network access device.

3. The system as recited in claim 2, wherein the account balance read from the releasable media device comprises a cash balance.

4. The system as recited in claim 3, wherein the updated account balance received from the network access device comprises an updated cash balance.

5. The system as recited in claim 2, wherein the account balance read from the readable media device comprises a pay-per-view movie credit balance.

6. The system as recited in claim 5, wherein the updated account balance received fro the network access device comprises an updated pay-per-view movie credit balance.

7. The system as recited in claim 1, wherein the port is a slot and the releasable media device is positionable in the slot.

* * * * *